United States Patent [19]
Lunden

[11] 3,737,052
[45] June 5, 1973

[54] CARRIAGE DRIVE FOR LUMBER STACKER
[75] Inventor: Sidney L. Lunden, Spokane, Wash.
[73] Assignee: Moore-Iem, Inc., Spokane, Wash.
[22] Filed: Jan. 3, 1972
[21] Appl. No.: 214,727

[52] U.S. Cl. ..............................214/6 DK, 214/6 G
[51] Int. Cl. .................................................B65g 57/10
[58] Field of Search ...................214/6 DK, 6 H, 6 P, 214/6 G, 6 M

[56] References Cited
UNITED STATES PATENTS

| 2,686,603 | 8/1954 | Lawson | 214/6 H |
| 2,730,247 | 1/1956 | Lawson | 214/6 H |
| 2,861,702 | 11/1958 | Mason | 214/6 H |
| 3,195,739 | 7/1965 | Hein et al. | 214/6 DK |
| 3,437,215 | 4/1969 | Lunden et al. | 214/6 DK |
| 3,610,443 | 10/1971 | Berge et al. | 214/6 DK |

Primary Examiner—Robert J. Spar
Attorney—Greek Wells, Richard J. St. John and David P. Roberts

[57] ABSTRACT

A crank carriage drive for a lumber stacking machine is described for gradually and smoothly accelerating the carriage from a course picking station and gradually and smoothly decelerating the carriage at a course stacking station. The crank drive has a crank arm rotatable about a crank axis and a crank connecting link interconnecting the crank arm and the carriage. One end of the connecting link pivots about a wrist pin axis as the crank is rotated. Maximum pivotal displacement of the connecting link occurs at the beginning and at the end of the forward stroke of the drive. A mechanism is provided that is responsive to the pivotal movement of the connecting link about the wrist pin axis to, (1), raise a course support means at the course pickup station to pick up a course, (2), carry the course to the course stacking station and, (3), lower the course at the stacking station.

8 Claims, 15 Drawing Figures

CARRIAGE DRIVE FOR LUMBER STACKER

BACKGROUND OF THE INVENTION

This invention relates to lumber stackers, and more particularly to drive means for moving a reciprocating carriage of a lumber stacker between a course pickup station and a course stacking station.

Many lumber stackers utilize a forked arm arrangement that is sequentially moved upward to pick up a course of boards or lumber at a course formation station, moved forward to carry the course over a course stacking station, lowered in front of a stripping mechanism and finally retracted to move the course against the stripping mechanism to remove the forked arms from underneath the course to allow the course to fall onto the top of the stack.

Various types of arrangements have been provided to lift the forked arm structure vertically to pick up a course of boards and carry the boards to a stacking station and then lower the boards in front of a stripping means. Ramp arrangements have been provided for raising the forked arm support vertically as the carriage is moved forward to pick up a course and carry it forward with a descending ramp provided at the end of the stroke to allow the forked arm assembly to drop in front of a stripping mechanism. An example of such a ramp arrangement is shown in the Lunden U. S. Pat. No. 3,437,215. Alternatively, vertical drives have been provided to raise and lower the forked arm assembly in coordination with the horizontal or reciprocating drive to raise and lower the course accordingly. Most frequently, the horizontal drive includes a hydraulic cylinder for reciprocating the carriage. The vertical lift arrangement is provided by a coordinated hydraulic cylinder such as illustrated in the Mason U. S. Pat. No. 3,169,646. Complicated hydraulic equipment and controls are required to sequence the correct operation and to provide for the desired acceleration of the forked arm structure to prevent the course from sliding or slipping on the forked arms as the carriage is being accelerated and decelerated.

One of the principal objects of this invention is to provide a carriage drive that provides the advantages of a smooth acceleration of the carriage at the beginning of the stroke and a gradual and smooth deceleration at the end of the carriage travel in conjunction with a unique means for lifting an arm assembly vertically at the beginning of the stroke to pick up a course of boards at the course formation station and to lower the course at the stacking station without utilizing complicated controls or brake mechanisms.

An additional object of the invention is to provide a unique apparatus for lifting the forked arm assembly in response to the movement of the carriage that is very simple in operation and inexpensive to construct, to provide a lower cost lumber stacker that is within the means of small specialty lumber producers.

A further object of this invention is to provide a crank drive mechanism for reciprocating a lumber stacker carriage in which a unique apparatus is provided to take advantage of the characteristic of a crank drive to raise and lower the forked arm assembly in a simple manner.

An additional object of this invention is to provide a lumber stacker that is relatively inexpensive to construct and which is extremely simple in operation providing a long life with substantially maintenance free operation.

These and other objects and advantages of this invention will become apparent upon reading the following detailed description of a preferred embodiment.

BRIEF DESCRIPTION OF THE DRAWINGS

A preferred and two alternate embodiments are illustrated in the accompanying drawings, in which.

DETAILED DESCRIPTION OF THE PREFERRED AND ALTERNATE EMBODIMENTS

Figure 1:
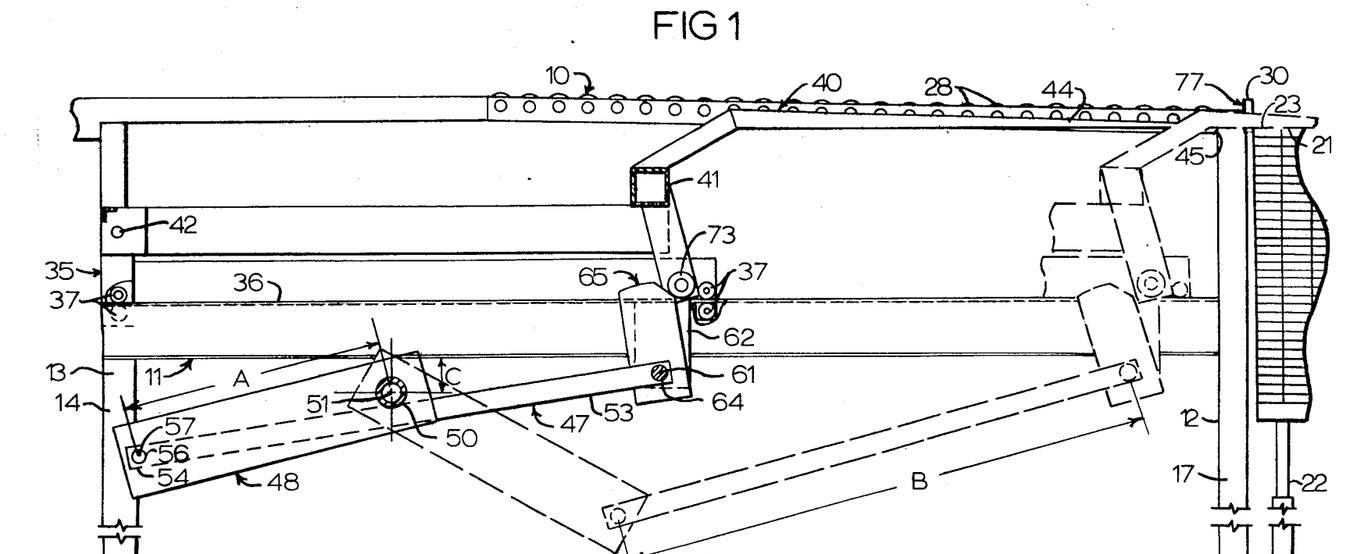
FIG. 1 is a sectioned side elevational view of a lumber stacker of the hoist configuration incorporating the principal features of this invention showing a carriage that is reciprocably mounted for movement in a stroke between a course pickup station and a course stacking station with carriage having a vertically movable course support means that is raised to pick up a course at the course pick up station and is lowered at the course stacking station.
Figure 2:
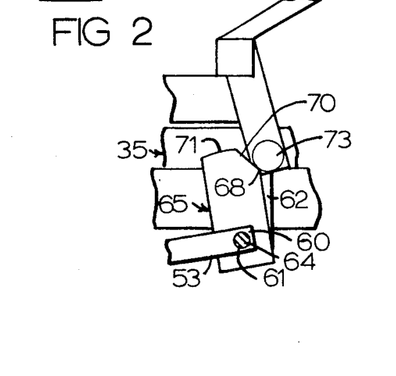
FIGS. 2-4 are enlarged fragmentary sequence views showing the mechanism for raising and lowering the course support means on the movable carriage.
Figure 3:
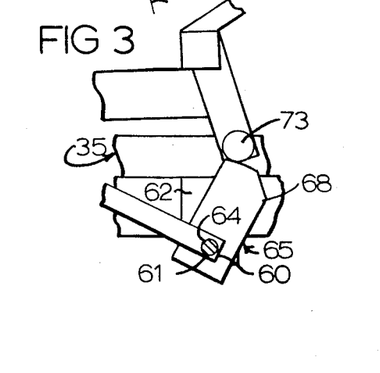
Figure 4:
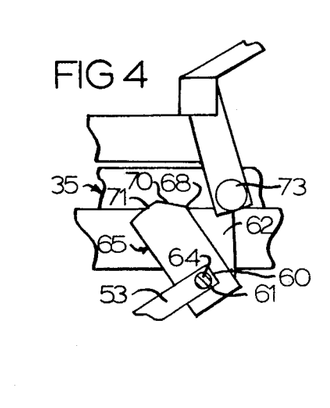
Figure 5:
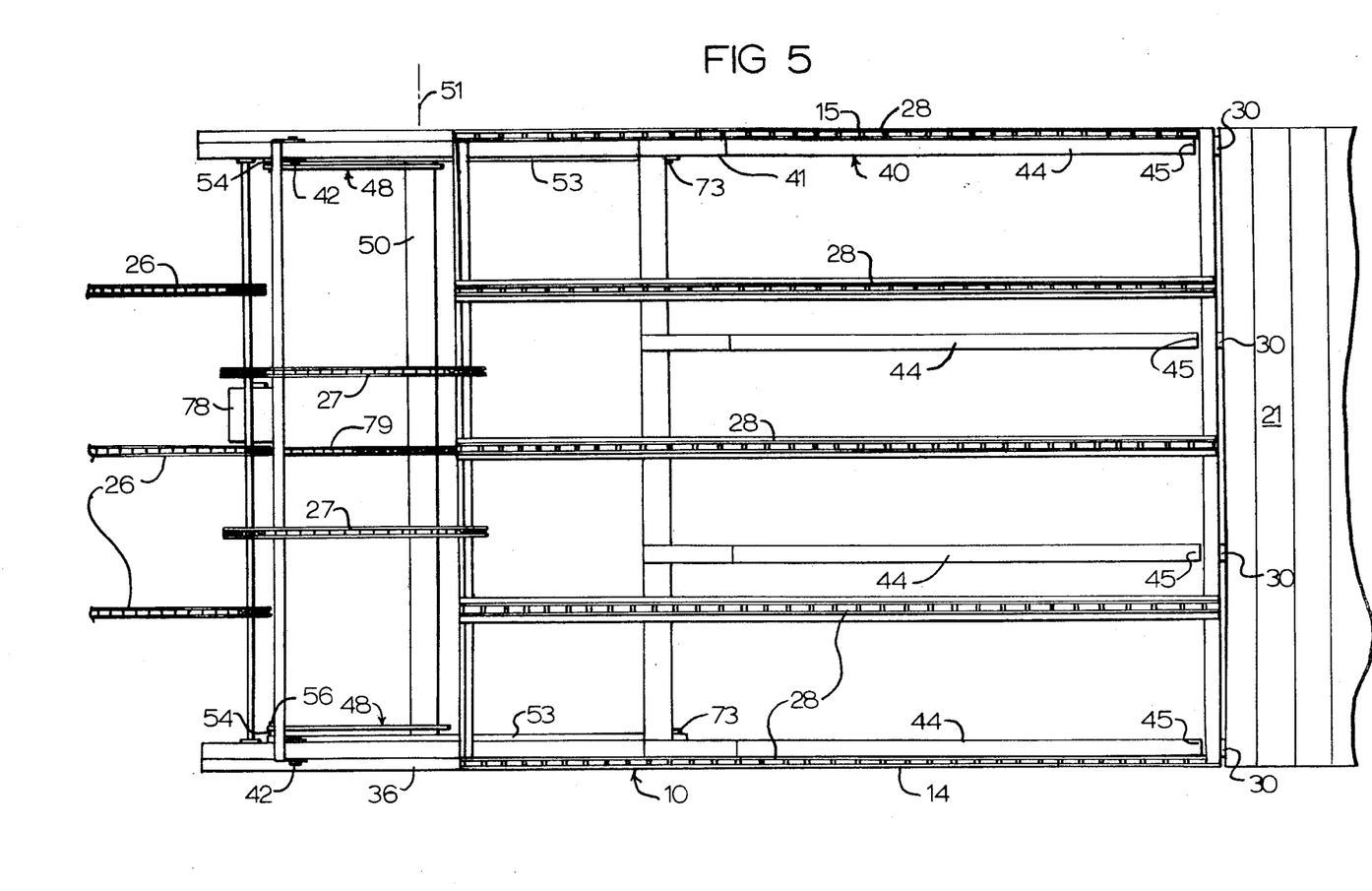
FIG. 5 is a plan view of the lumber stacking apparatus illustrated in FIG. 1.

Referring now in detail to FIG. 1, there is shown a lumber stacking apparatus generally designated by the numeral 10, having a general frame 11. The lumber stacking apparatus has a front 12, a rear 13 and a sides 14 and 15 (FIG. 5). The frame 11 has uprights 17 along the front 12. The object of the lumber stacking apparatus is to form a course of boards on the lumber stacking apparatus at a course pickup station 20, pick up the formed course at the course pickup station 20, carry the course forward to a course stacking station 21 in front of the upright 17, and then lower the course to vertically stack the courses. As illustrated in FIG. 1, a hoist-type stacking arrangement 22 is provided in which the stack is lowered each time a layer is placed on the stack to provide a rather constant elevation top layer until a full stack is formed. A layer or course of boards is identified by the numeral 23.

The lumber stacking apparatus 10 includes a course formation means 25 that includes an infeed power conveyor 26, a lumber stacking apparatus conveyor 27 and inclined gravity rollers 28 that extend forward and downward at an inclined angle to move boards fed by the infeed conveyor to the front 12. Stops 30 are provided on the uprights 17 that project upward into the path of the boards on the inclined gravity rollers 28. A course is formed by backing up the boards one behind the other until a sufficient number of boards are resting on the inclined gravity rollers to constitute a course.

The lumber stacking apparatus 10 has a reciprocating carriage 35 that is mounted for movement on the frame in longitudinal tracks 36. The carriage 35 has rollers 37 that ride in the tracks 36 to enable the carriage to move from the rear 13 to the front 12 as illustrated in FIG. 1. The carriage 35 reciprocates in the track 36 below the gravity rollers 28.

A course support means 40 is mounted on the carriage 35 for reciprocating movement with the carriage and is also mounted on the carriage for vertical movement to be lifted upward above the inclined gravity rollers to lift the formed course above the stops 30 and to maintain the course elevated as the carriage moves from the course pickup station to the course stacking station. The course support means includes a frame 41 that is pivotally mounted to the carriage at pivot connection 42. The frame 41 has a plurality of forwardly extending arms 44 in which the arms are substantially wedge shaped with inclined top surface that taper down to arm tips 45.

The lumber stacking apparatus has a carriage drive generally designated by the numeral 47 that includes a crank mechanism 48. The crank mechanism 48 includes a crank shaft 50 that is mounted transverse to movement of the carriage for rotation about a fixed horizontal crank axis 51. The crank shaft 50 has two crank arms 52 that are fixed thereto and extend outwardly in a radial direction. Connecting links or pitmans 53 interconnect the ends of the crank arms 52 to the carriage 35. Specifically, each connecting link 53 has an end 54 that is pivotally connected to the crank arm 52 at a pivot connection 56 for pivotal movement about an elbow axis 57. The length of the crank arm is defined by the radial distance between the crank axis 51 and the elbow axis 57. This distance is identified by the letter A. The connecting link 53 has an opposite end 60 that is pivotally connected to the carriage at a wrist pin or shaft that is mounted on a bracket 62 affixed to the carriage. The end 60 pivots about a wrist pin axis 64. The length of the connecting link is defined by a straight line distance between the elbow axis 57 and the wrist pin axis 64. This distance is identified by the letter B. It should be noted that in this configuration the crank axis 51 is vertically offset a selected distance C from the wrist pin axis 64. The carriage drive 47 is designed to initially move the carriage forward in a forward stroke from the course pickup station to the course stacking station and then return the carriage in a return stroke from the course stacking station to the course pickup station to receive a succeeding course.

The lumber stacking apparatus 10 has an elevating means 65 that is responsive to the pivotal movement or displacement of the connecting link 53 about the wrist pin axis 64 to raise or pivot upward the course support means at the beginning of the forward stroke of the carriage to pick up a formed course from the gravity rollers 28 and elevate the course above the stops 30 and to maintain such elevation as the carriage is moved forward to the course stacking station and then to lower the supported course in front of the stops 30. The elevating means includes a cam mechanism having a cam 66 affixed to the end 60 for pivotal movement about the wrist pin axis 64 in response to the pivotal movement of the connecting link 53 about the wrist pin axis 64. The cam 66 has a lobe 68 that is defined by an inclined surface 70 having a rapidly increasing radius of curvature from the wrist pin axis 64 and a communicating curved surface 71 having a substantially constant radius of curvature from the wrist pin axis 64. The cam mechanism includes a cam follower 73 that is defined by a roller 74 mounted on a bracket 75 affixed to the course support means. The cam follower 73 rides on the surfaces 70 and 71 as the carriage is reciprocated between the course pickup station and the course stacking station. When the cam follower 73 engages the inclined surface 70 the course support means 40 is either being raised or lowered. When the cam follower rides on the curved surface 71 the layer support means is being maintained in the elevated position during the reciprocating movement of the forward stroke.

The lumber stacking apparatus 10 includes a stripping means 77 that may be defined by the uprights 17 or the stops 30 to strip the course from the course support means when the carriage is reciprocated in the return stroke to pull the arm 44 rearward through the front 12 of the machine.

The crank drive 48 includes a constant speed motor 78 (FIG. 5) having a chain drive 79 between the motor 78 and the crank shaft 50 for rotating the crank shaft 50 and the crank arms 52 in a full circle at a constant rpm and constant angular velocity. The angular displacement of the crank arms 52 about the crank axis is identified by the Greek letter $\theta$.

Figure 6:
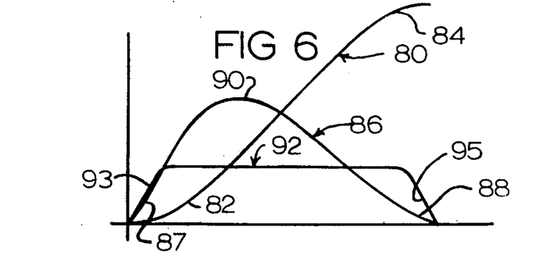
FIG. 6 is a schematic graph showing curves of the linear displacement of the carriage, the velocity of the carriage and the vertical displacement of the course support means in relation to the angular displacement of a drive crank.
Figure 7:
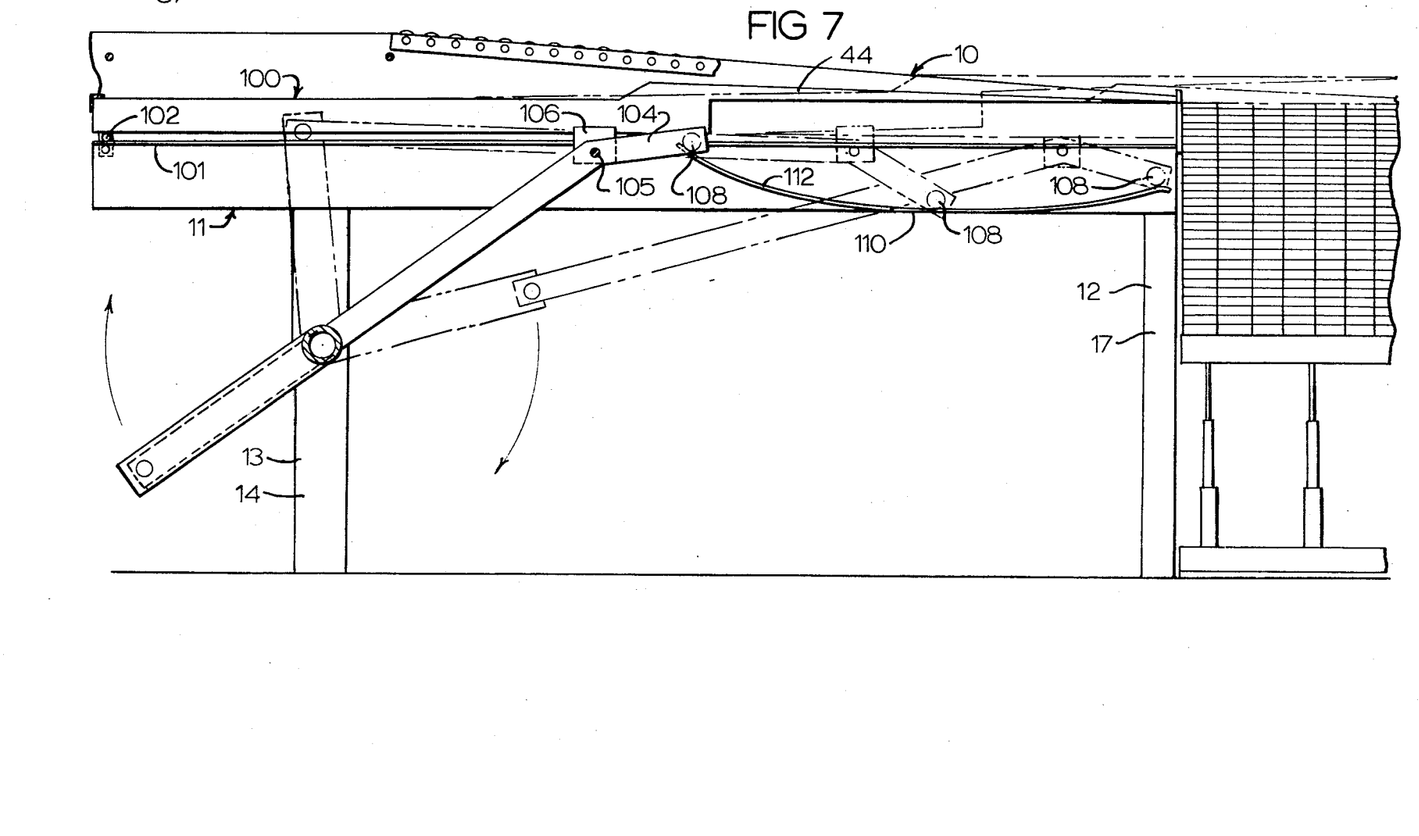
FIG. 7 is a side elevational view of an alternate embodiment of the lumber stacking means showing a different arrangement for raising the course support means.

FIG. 6 illustrates the interrelationships between the linear displacement or percentage of stroke movement of the carriage; the velocity of the carriage; and the vertical displacement of the course support means, in relation to the angular displacement of the crank shaft 50 or the cranks arms 52.

The formula for the linear displacement (A) of the carriage in relation to the angular displacement ($\theta$) of the crank arm is generally written as:

$$x = A(1 - \cos\theta) + A^2/2B \sin^2\theta$$

[1]

The velocity ($v$) of the carriage in relation to the angular displacement ($\theta$) of the crank arm, assuming a constant angular velocity ($w$) of the crank arm is generally written as:

$$v = Aw [\sin\theta + A/2B \sin 2\theta]$$

[2]

The acceleration ($a$) of the carriage in relation to the angular displacement ($\theta$) of the crank arm, assuming a constant angular velocity ($w$) of the crank arm is generally written as:

$$a = Aw^2 [\cos\theta + A/B \cos 2\theta]$$

[3]

The formulas [1], [2] and [3] all assume that the crank axis 51 and the wrist pin axis 64 are at the same elevation or that C = 0. The offset C shifts the curves somewhat, however the basic relationships are still the same. The offset C with the wrist pin axis 64 above the crank axis 51 provides a forward stroke of somewhat greater than 180° of the crank displacement and a return stroke (quick return) of somewhat less than 180° of the crank displacement. Under certain conditions it may be desirable to place the wrist pin axis 64 below the crank axis 51.

The linear displacement or percentage of stroke in relation to the angular displacement of the crank shaft 50 is illustrated by the curve 80. The angular displacement is indicated along the abscissa coordinate and the distance traveled (linear displacement) or percentage of stroke is indicated along the ordinate coordinate. The curve 80 has a beginning section 82 in which there is a substantial angular displacement of the crank shaft with minimal reciprocating movement of the carriage. This indicates that a substantial angular movement of the crank takes place before there is an appreciable movement of the carriage. The curve 80 then flows into a rapidly ascending section 83 showing that the carriage moves a substantial distance in a relatively short angular displacement The curve 80 then has a section 84 showing that there is relatively little reciprocating movement near the end of the stroke in relation to the amount of angular displacement of the rank.

A curve identified by the numeral 86, shows the relationship of the velocity of the carriage in relation to the angular displacement of the crank shaft 50. The velocity curve 86 is a modified sine curve that is distorted toward the left as illustrated in FIG. 6. Initially the curve shows a steady increase in velocity by the beginning section 87. The acceleration of the carriage progressively decreases providing for a smooth steady movement of the carriage. The curve shows that the maximum velocity (zero acceleration) is reached at less than 90° movement of the crank mechanism as illustrated by the curve section 90. The velocity of the carriage then is decreased at substantially constant rates as illustrated by the curve section 88 to provide for a gradual and smooth deceleration of the carriage near the end of the stroke.

Curve 92 indicates the vertical displacement of the course supporting means 40 in relationship to the angular displacement of the crank shaft 50 and the crank arm 52. The vertical displacement curve 92 shows a steep initial section 93 of rapid vertical movement of the course support means in a relatively few degrees movement of the crank arm 52. The relationship between the curve 92 and the distance curve 80 is important to show that the course support means 40 is fully elevated in a relatively short distance of movement of the carriage at the beginning of the stroke.

It should be noted that the maximum angular displacement of the connecting link 53 about the wrist pin axis 64 occurs near the beginning and near the end of the stroke. The curve 92 is a modified sine curve of the basic sinusoidal relationship between the angular displacement of the connecting link 53 about the wrist pin axis 64 and the angular displacement of the crank shaft 50. The sine relationship is substantially maintained while cam follower 73 rides upon the inclined surface 70. This basic sine relationship however, is modified when the cam follower rides on the curved surface 71 to provide a cut off or plateau 87 of the curve 92. Since the radius of curvature of the curved surface 71 is substantially constant there is relatively little vertical movement of the course support means during the forward stroke except at the very beginning and at the very end of the stroke. As the carriage approaches the end of the stroke the cam follower moves toward the end of the curved surface 71 and then rides down the inclined surface 70 at a rather fast rate in response to the rapid pivotal movement of the connecting link 53 about the wrist pin axis 64 near the end of the stroke. This is illustrated by the steep descent portion 95 of he curve 92.

It should be understood that the curves 86 and 92 are merely illustrative of the principles of this invention and unintended to be restrictive. It should be understood that the lift and reciprocating relationships in response to the angular movement of the crank shaft may be altered by alternating the distances A of the crank arm, distance B of the connecting link 53 and the offset distance C.

Figure 8:
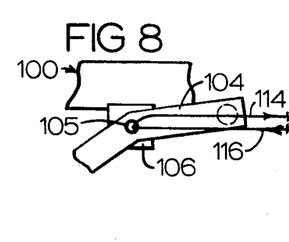
FIGS. 8-10 is a fragmentary enlarged sequence view showing various positions of a mechanism shown in FIG. 7 for raising the course support means in relationship to the stroke of the carriage.
Figures 9, 10:
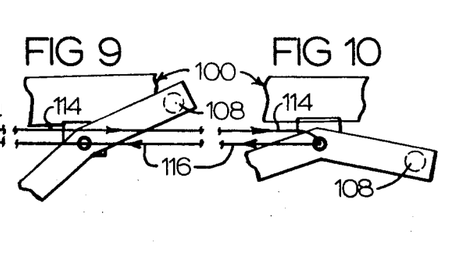

An alternate embodiment of this invention is illustrated in FIGS. 7-10. The lumber stacking apparatus 10 illustrated in FIGS. 7-10 has a carriage 100 that is reciprocably mounted for movement on a track 101. In this embodiment the carriage is pivotally mounted to the track 101 through the roller combination 102 to provide a pivot connection to enable the forward end of the carriage to be elevated. In this embodiment, the course support means and the carriage are substantially one integral component in which the arms 44 are affixed to the carriage. The connecting link 53 is pivotally connected to the carriage through a wrist pin 105 that is supported on a bracket 106 affixed to the carriage 100. The connecting link 53 has a connecting link extension 104 that extends beyond the wrist pin 105 supporting a cam follower 108. An elongated cam 110 is mounted on the frame 11 adjacent to the track 101. The cam 110 has a surface 112 on which the cam follower 108 rides. The wrist pin 105 moves vertically in response to the longitudinal movement of the carriage to elevate the forward end of the carriage to lift the arms at the course pickup station to pick up a course and carry the course to the course stacking station. FIGS. 8-10 are sequence views showing a forward path 114 and a return path 116 of the wrist pin axis to indicate the vertical movement of the wrist pin and the course support means. The same basic relationships illustrated in the curved in FIG. 6, apply to the configuration illustrated in FIGS. 7-10.

A second alternate embodiment is illustrated in FIGS. 11-15. The embodiments illustrated in FIGS. 1-10 illustrate the lumber stacking apparatus being utilized in conjunction with the hoist stacking arrangement in which the stack is incrementally indexed downwardly to provide a constant elevation surface on which to place each succeeding course. The lumber stacking apparatus illustrated in FIGS. 11-15 is utilized in a hoistless stacking configuration in which the stack is formed on a platform 120. In this configuration the elevation of the stack increases incrementally as each layer is added. In this configuration, the layer or the course support means 40 is mounted on a vertically movable carriage 121 that is movable on vertical rails 123 that are part of the carriage 85. The vertically movable carriage 121 includes a cross bar 125 extending from side to side of the lumber stacking apparatus with the arms 44 affixed thereto at spaced intervals. The vertically movable carriage 121 has side frames with diagonally spaced rollers 127 and 128 that ride on the vertical rails 123. The rollers 128 provides a pivotal connection to enable the arms to be pivoted upward.

The elevating means 65 includes a cam follower 131 that is fixed on the end of brackets 132 that extend downward from the cross bar 125. The connecting link 53 is connected to a bracket 134 that supports the wrist pin 61. A bracket 135 is affixed to the rail 123 vertically above the bracket 134. A pivot lever 136 is pivotally mounted to the bracket 135 for movement pivotally about a cam axis 138. The pivot lever 136 has an end with a cam 137 formed thereon having an inclined cam surface 140 that is similar to cam surface 70 and a curved cam surface 141 similar to cam surface 71. A connecting rod 143 is pivotally connected between the pivot lever 136 and the connecting link 53. As the crank shaft is rotated the cam 137 will pivot about the cam axis 138 and in response to the pivotal movement of the connecting link 53 about the wrist pin axis 64. The relationship of the vertical movement of the course support means, the linear velocity and displacement of the carriage in relation to the angular displacement of the crank is similar to the illustrated by the curves in FIG. 6.

Figure 11:
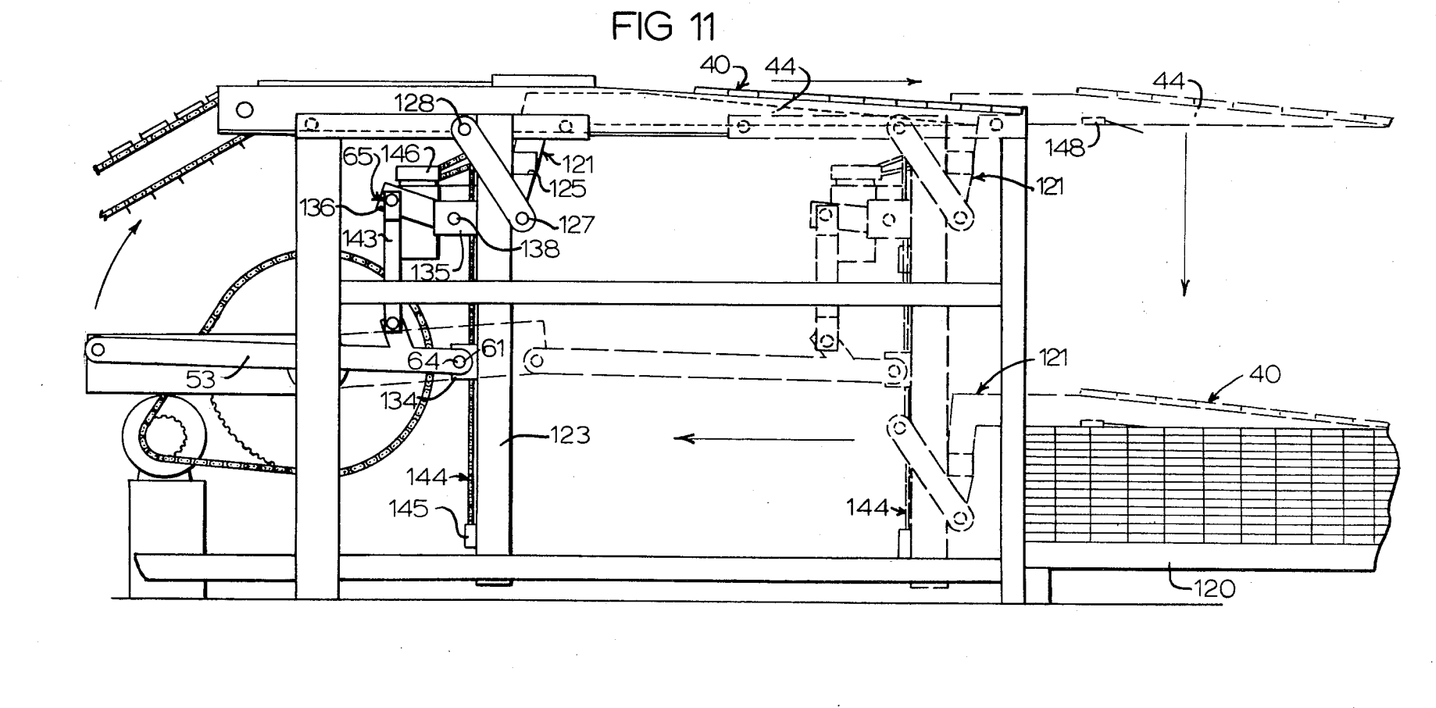
FIG. 11 is a side elevational view of a second alternate embodi-ment showing a lumber stacking apparatus of a hoistless configuration.
Figure 12:
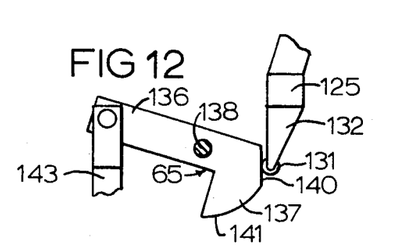
FIGS. 12-14 are enlarged fragmentary sequential views showing a mechanism shown in FIG. 12 for raising the course support means as the carriage is reciprocated.
Figure 13:
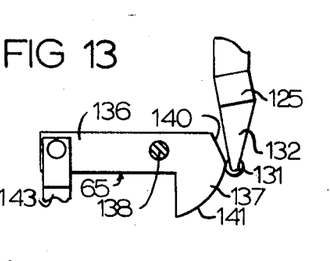
Figure 14:
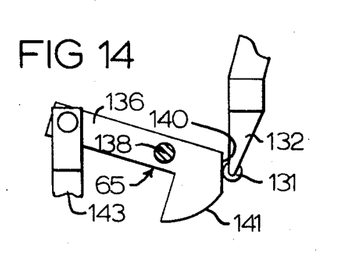
Figure 15:
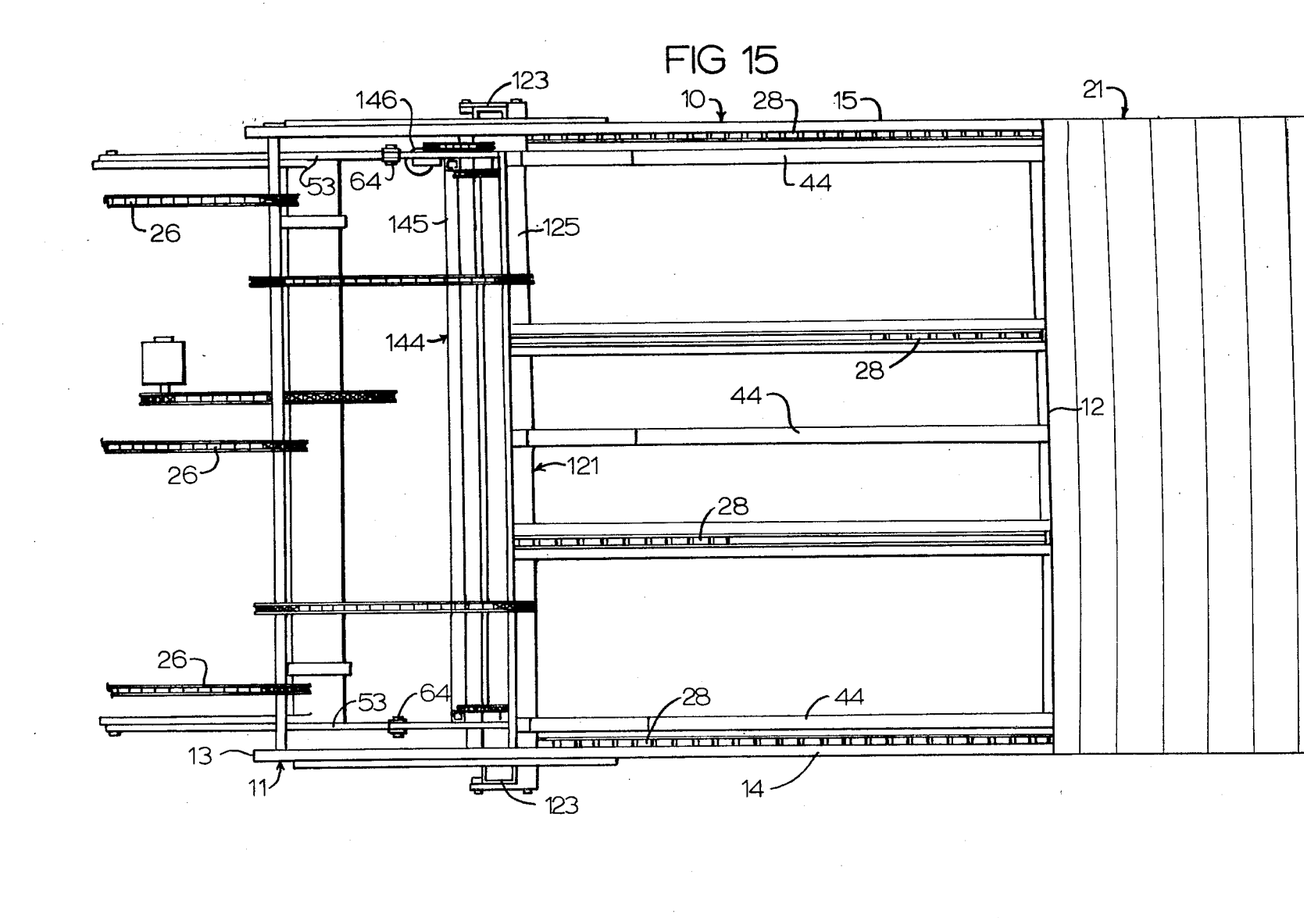
FIG. 15 is a plan view of the lumber stacking apparatus illustrated in FIG. 7.

After the carriage is moved to the course stacking station the vertically movable carriage 121 is allowed to descend to position the course immediately above the top of the stack. The lumber stacking apparatus has a feeler switch 148 that senses the elevation of the stack. The vertically movable carriage 121 is raised and lowered through a counterweight mechanism 144 in conjunction with a constant speed motor 146. Specific details of the operation of the motor 146 and the counterweight 145 may be obtained by reading the Lunden U. S. Pat. application, Ser. No. 107,008, filed on Jan. 18, 1971.

It should be understood that the above described embodiments are simply illustrative of the principles of this invention and that numerous other embodiments may be readily devised by those skilled in the art without deviating therefrom. Therefore only the following claims are intended to define this invention.

What is claimed is:

1. In a lumber stacking apparatus, means for reciprocating a carriage between a course pickup station and course stacking station and for vertically moving a course support means on the carriage to pick up a course of boards at the course pickup station and to lower the course of boards at the course stacking station, comprising:
   a crank mechanism connected to the carriage having a crank arm affixed to a crank shaft and a connecting link having one end pivotally connected to the crank arm and an opposite end operatively connected to the carriage for pivotal movement about a wrist pin axis to move the carriage in a reciprocating stroke between the course pickup station and the course stacking station in response to the rotation of the crank shaft;
   elevating means operatively connected to the connecting link for vertically moving the course support means in response to the pivotal movement of the connecting link about the wrist pin axis at the beginning and end of the stroke; and
   a motor means operatively connected to the crank shaft for rotating the crank shaft at least in part circle at a relatively constant angular velocity to gradually and smoothly accelerate the carriage and vertically raise the course support means to pick up the course at the beginning of the forward stroke and the gradually and smoothly decelerate the carriage and vertically lower the course support means near the end of the forward stroke.

2. In the lumber stacking apparatus as set out in claim 1 wherein the elevating means includes a cam mechanism that is responsive to the pivotal movement of the connecting link about the wrist pin axis for, (1), raising the course support means at the beginning of the forward stroke to pick up a course at the course pick up station, (2), maintaining the course support means elevated during the forward stroke, and, (3), lowering the course support means at the end of the forward stroke to lower the course at the course stacking station.

3. In the lumber stacking apparatus as defined in claim 2 wherein the cam mechanism has a cam that is mounted on the carriage for pivotal movement about a cam axis in response to the pivotal movement of the connecting rod about the wrist pin axis and a cam follower operatively connected to the course support means for engaging the cam, said cam having a lobe with a selected profile to move the cam follower to raise the course support means at the beginning of the stroke and lower the course support means at the end of the forward stroke.

4. In the lumber stacking apparatus as defined in claim 3 wherein the lobe has a first surface with a rapidly increasing radius of curvature for engaging the cam follower during the beginning and at the end of the forward stroke to raise and to lower the course support means respectively and a second surface of substantially constant radius of curvature communicating with the first surface to maintain the course support means elevated between the beginning and end of the forward stroke.

5. In the lumber stacking apparatus as defined in claim 1 wherein the lumber stacking apparatus has a stripping means at the course stacking station and wherein the elevating means raises the course support means a sufficient distance to clear the stripping means during the forward stroke and then lowers the course support means in front of the stripping means and wherein the motor means rotates the crank full circle to move the carriage from the course stacking station to the course pickup station in a return stroke while maintaining the course support means lowered to strip the course from the course support means against the stripping means during the return stroke of the carriage.

6. In the lumber stacking apparatus as defined in claim 5 wherein the crank shaft axis is vertically offset a desired distance from the wrist pin axis to provide a quick return of the carriage during the return stroke.

7. In the lumber stacking apparatus as defined in claim 1 wherein the lumber stacking apparatus has a course formation means at the course pickup station that includes a board feeding means for successively feeding boards to the course pickup station and a stop means projecting into the path of the fed boards to form a course of boards behind the stop means and wherein the elevating means raises the course support means a sufficient distance to pick up the formed course and to elevate the formed course above the stop means to carry the course over the stop means during the forward stroke of the carriage.

8. A lumber stacking apparatus, comprising:

a frame;

a carriage mounted on the frame for movement between a course pickup station and a course stacking station;

a course support means mounted on the carriage for vertical movement to pickup up a course at the course pickup station and lower the course at the course stacking station;

a crank drive means operatively connected to the carriage for moving the carriage in a forward stroke from the course pickup station to the course stacking station, in which the crank drive means has a crank arm affixed to a crank shaft and a connecting link with one end pivotally connected to the crank arm and an opposite end operatively connected to the carriage for pivotal movement about a wrist pin axis to gradually and smoothly accelerate the carriage from the course pickup station and to gradually and smoothly decelerate the carriage to the course stacking station; and means operatively connected to the connecting link for vertically moving the course support means in response to the pivotable movement of the connecting link about the wrist pin axis to raise the course support means to pick up a course at the beginning of the forward stroke and to lower the course at the end of the forward stroke.

* * * * *